United States Patent [19]

Klenk et al.

[11] 4,396,039
[45] Aug. 2, 1983

[54] SMOKE-PERMEABLE TUBULAR CASING AND PROCESS FOR ITS MANUFACTURE

[75] Inventors: Ludwig Klenk, Hallgarten; Herbert Porrman, Niedernhausen; Walter Seifried, Wiesbaden; Karl Stenger, Ruedesheim, all of Fed. Rep. of Germany

[73] Assignee: Hoechst Aktiengesellschaft, Frankfurt am Main, Fed. Rep. of Germany

[21] Appl. No.: 325,001

[22] Filed: Nov. 25, 1981

[30] Foreign Application Priority Data

Feb. 17, 1981 [DE] Fed. Rep. of Germany ....... 3105718

[51] Int. Cl.³ .................. F16L 11/00; A22C 13/00
[52] U.S. Cl. .................. 138/118.1; 138/137; 138/156; 426/105; 426/135; 426/140; 428/36
[58] Field of Search .................. 138/118.1; 428/36; 426/105, 135, 140, 412, 413, 414, 513

[56] References Cited

U.S. PATENT DOCUMENTS

| 2,000,835 | 5/1935 | Goldberger . | |
|---|---|---|---|
| 2,148,884 | 2/1939 | Walter . | |
| 2,181,887 | 12/1939 | Goodman . | |
| 2,210,436 | 8/1940 | Weingand et al. | 138/118.1 |
| 2,226,442 | 12/1940 | Rumsey . | |
| 2,573,956 | 11/1951 | Daniel, Jr. et al. . | |
| 2,608,488 | 8/1952 | Rumsey, Jr. | 138/118.1 |
| 2,653,432 | 9/1953 | Wright et al. . | |
| 2,685,769 | 8/1954 | Conti . | |
| 2,685,770 | 8/1954 | Conti . | |
| 2,686,725 | 8/1954 | Cornwell | 138/118.1 |
| 2,757,495 | 8/1956 | Reichel . | |
| 2,773,773 | 12/1956 | Harder et al. . | |
| 2,819,488 | 1/1958 | Gimbel . | |
| 2,857,283 | 10/1958 | Firth et al. | 138/118.1 |
| 2,999,788 | 9/1961 | Morgan . | |
| 3,546,209 | 12/1970 | Lipps . | |
| 3,594,857 | 7/1971 | Michl . | |
| 3,619,854 | 11/1971 | Ilgen . | |
| 3,766,603 | 10/1973 | Urbutis et al. . | |
| 3,884,270 | 5/1975 | Rasmussen et al. . | |
| 3,988,804 | 11/1976 | Regner et al. . | |
| 4,185,358 | 1/1980 | Regner et al. . | |
| 4,356,199 | 10/1982 | Hammer et al. | 426/105 |
| 4,356,200 | 10/1982 | Hammer et al. | 426/105 |

FOREIGN PATENT DOCUMENTS

| 14346 | 1/1980 | European Pat. Off. . |
| 1385394 | 12/1964 | France . |
| 2336884 | 7/1977 | France . |
| 865727 | 4/1961 | United Kingdom . |
| 908205 | 10/1962 | United Kingdom . |

Primary Examiner—William R. Dixon, Jr.
Attorney, Agent, or Firm—Schwartz, Jeffery, Schwaab, Mack, Blumenthal & Koch

[57] ABSTRACT

Disclosed is a tubular casing of fiber-reinforced regenerated cellulose comprising a film web which is curved to form a tube. The edge regions of the film web, which run parallel to the longitudinal axis, abut or overlap slightly and are sealed by means of a film strip which covers both the edge regions. The film web and the film strip composed of the same material have, in the wet remoistened stage, a breaking strength of about 15 to 30 N/mm² and an elongation at break of about 30 to 50% in the longitudinal direction of the web, and a breaking strength of about 15 to 35 N/mm² and an elongation at break of about 30 to 50% in the transverse direction of the web. The breaking strength in the transverse direction of the web is equal to or greater than that in the longitudinal direction of the web. The adhesive layer is smoke-permeable and is preferably composed of a material system which sets without a chemical reaction. The film web is produced from viscose, and it is prevented from shrinking during the process and is stretched in the transverse direction during drying. The tubular casing finds particular application as a sausage casing.

30 Claims, 14 Drawing Figures

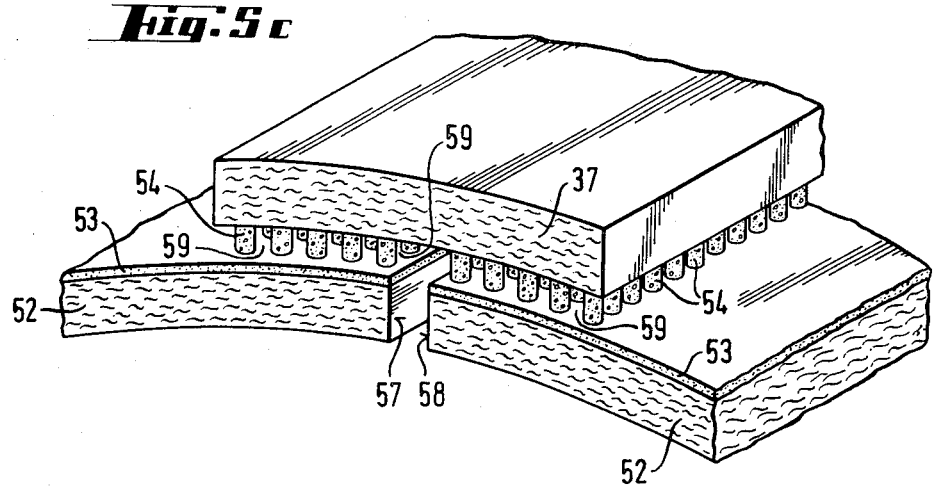
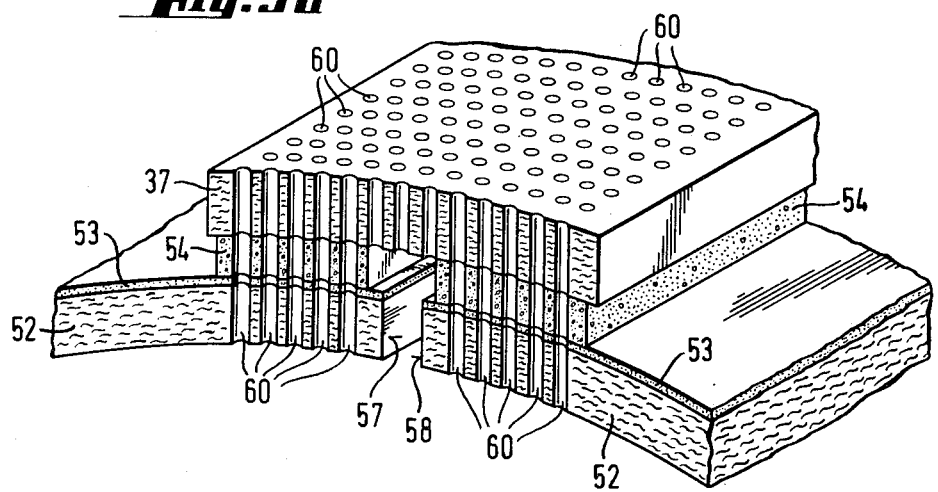

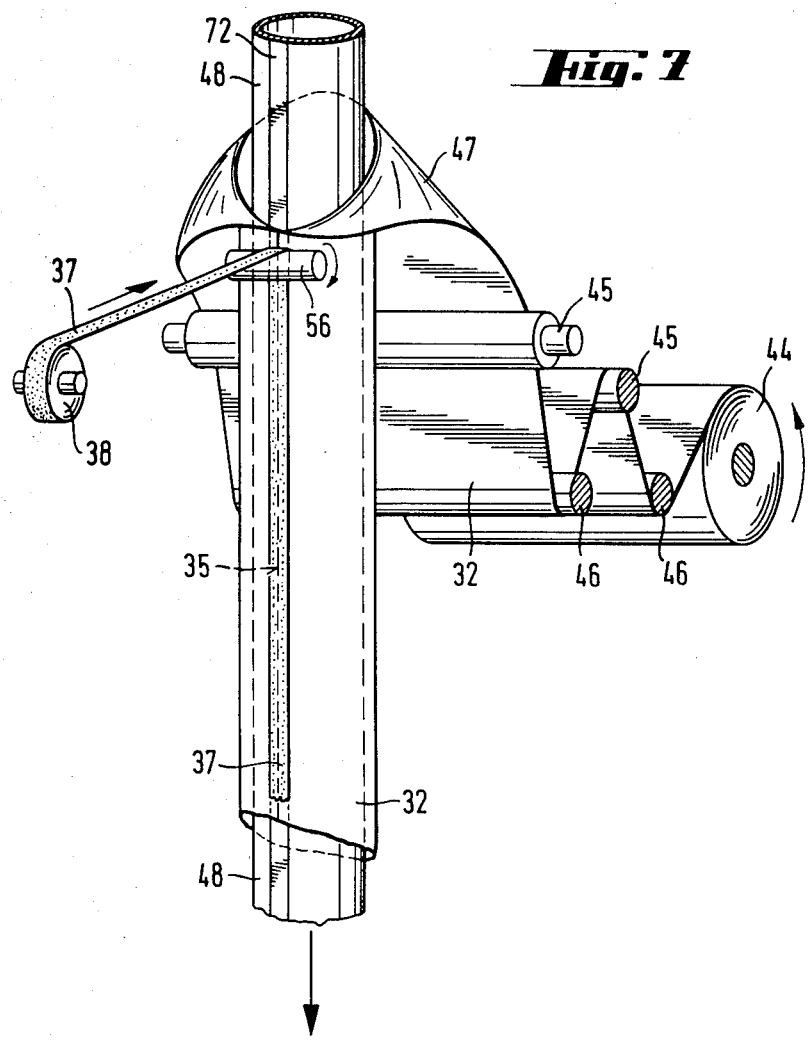

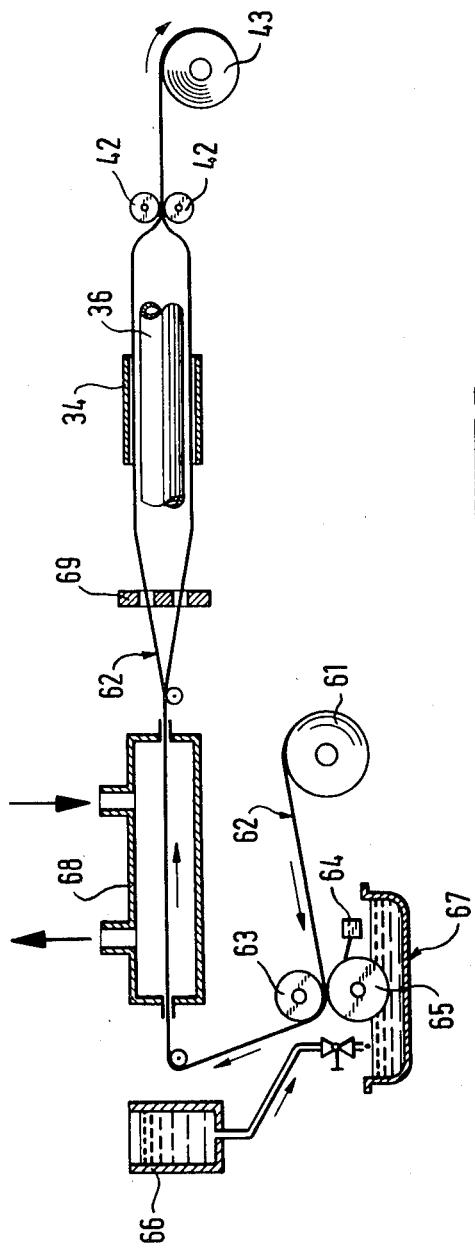

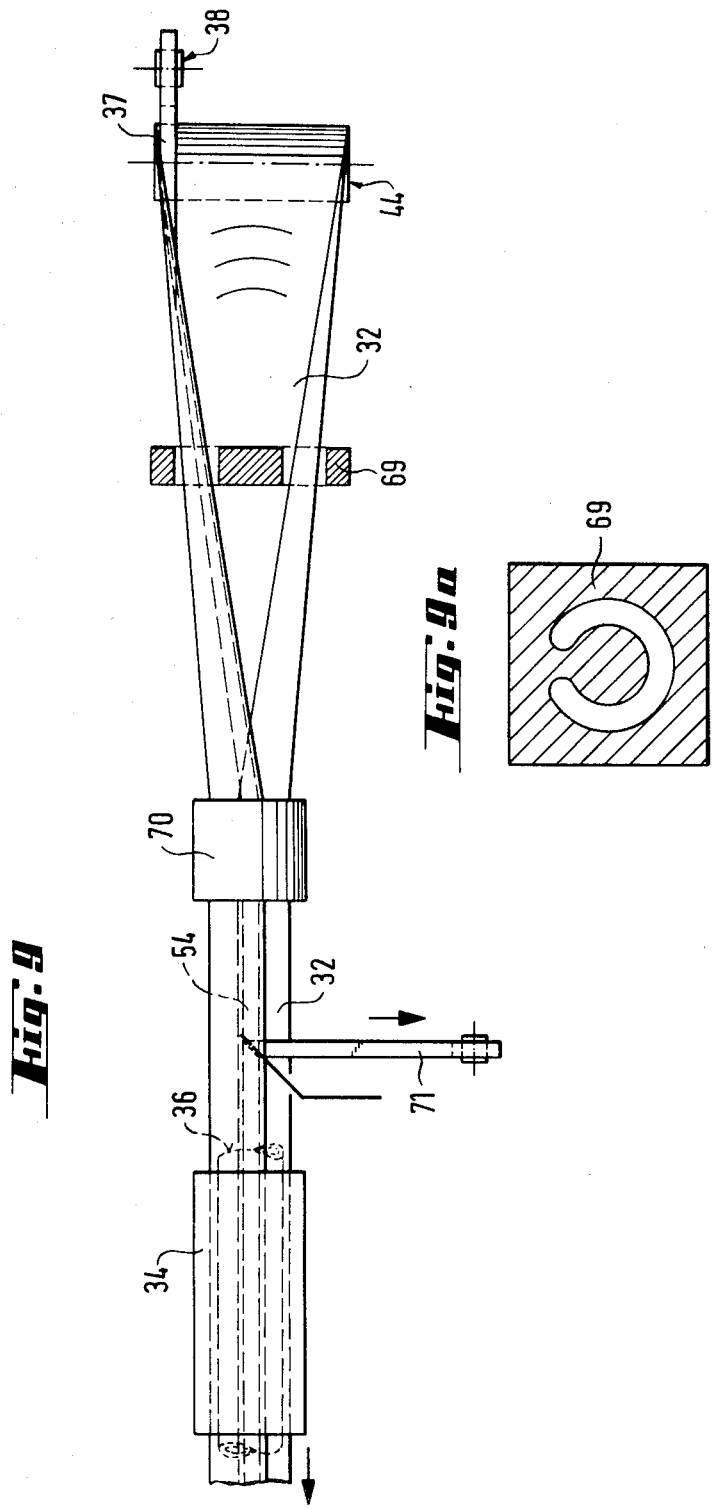

SMOKE-PERMEABLE TUBULAR CASING AND PROCESS FOR ITS MANUFACTURE

BACKGROUND OF THE INVENTION

The present invention relates to a tubular casing for foodstuffs, in particular for its use as a sausage casing, and more especially to a casing which is permeable to smoke, wherein a web of regenerated cellulose is formed into a tube by curving the web along the longitudinal axis, meeting or overlapping the edges and adhesively bonding the edges, in particular with a film strip also of regenerated cellulose. The present invention also relates to a process for the manufacture of such casings.

Tubular casings made from a web, for example of regenerated cellulose, which are manufactured by folding the web along the longitudinal axis and gluing the overlapping edge zones running parallel to the longitudinal axis are already known (U.S. Pat. Nos. 2,148,844, 2,226,442, 2,685,769, 2,685,770, 2,686,725, 2,757,495 and 2,773,773). The gluing operations hitherto described comprise either the use of solvents with which the surface of the web is incipiently dissolved and tackified, whereupon an "adhesive" is produced in situ on the surface of the web, or the use of webs which are coated with a thermoplastic resin or are composed of a thermoplastic material which can be sealed when heat and pressure are applied.

Thus, U.S. Pat. No. 2,653,432 describes a process for bonding the overlapping edges of a film by means of a strip of thermoplastic material, which is located between the overlapping edges and becomes tacky on heating. Also, the film can be composed of regenerated cellulose and can have a fiber reinforcement, if appropriate. Acrylate and polyvinylidene chloride are mentioned as examples of this thermoplastic material. This known tubular casing can also have a moisture-tight coating on the outside, the overlapping edges then being kept free of coating and the remaining surface being kept free of thermoplastic material. The casing material can be pre-stretched, preferably in the longitudinal direction.

This old process, which has been known for about 30 years, is hardly used any longer. In particular, an overlapping seam formed by sealing the superposed edge zones is not sufficiently strong and is also completely unsatisfactory for reasons of a appearance. Moreover, these known tubular casings can be manufactured only in a relatively involved manner, i.e., at high temperatures, with long residence times until the adhesive has set and, in some cases, with the aid of acids or organic solvents which can be removed from the tubular casing only with difficulty and by very expensive measures.

For sausages which must have a tubular casing which is permeable to smoke and gas, the known casings with a glued seam are not suitable, since the seam region is not sufficiently permeable.

Therefore, previously, sausage casings have been manufactured predominantly from seamless material, although some disadvantages must be accepted in the case of these seamless tubes. In particular, this process is very cost-intensive.

Seamless tubes of fiber-reinforced regenerated cellulose are usually manufactured by the following essential process steps. A web of non-woven fiber is formed to give the shape of a tube, the edges of which overlap and are glued with viscose. After one-sided or two-sided coating with viscose from annular slot dies, the tube is coagulated, regenerated to give cellulose hydrate gel and dried. During this process, the tube is supported by the gas mixture formed during the coagulation and regeneration and, during drying it is supported by an enclosed volume of air which has been introduced. If appropriate, the tube is stretched in the longitudinal and transverse directions in order to improve the mechanical properties.

Disadvantageously, weakened zones, so-called spinning edges, which run parallel to the longitudinal axis in the edge region appear, for example, on the edges of the gel tube laid flat. Moreover, the stretching process also has disadvantages.

Neither the internal pressure of the process gases nor the internal pressure during drying can be controlled with sufficient accuracy, so that the diameter of the tubes cannot be kept constant within narrow limits. A further disadvantage is that, when tubes are stretched by means of an expanding gas, the ratio of the stretching forces acting in the tangential and axial directions is fixed, so that, for this reason, the mechanical properties, in particular the shrinking properties and the strength in the longitudinal and transverse directions, of the seamless tube are also fixed.

SUMMARY OF THE INVENTION

It is therefore an object of the present invention to provide a fiber-reinforced tubular casing which is composed of regenerated cellulose and does not have these disadvantages of the seamless tubular casing and which, rather, has optimum mechanical properties, in particular shrinkage values and strength values.

Another object of the present invention is to provide a tubular casing of regenerated cellulose having a glued seam which withstands severe mechanical and thermal stresses and the action of hot water without impairing the flavor and appearance of the foodstuff.

It is a further object of the present invention to provide a tubular casing of regenerated cellulose which is adequately permeable to gas and smoke in the glued zone and, at the same time, has a high tensile strength.

Yet another object of the present invention is to provide a tubular casing of regenerated cellulose which is intended for foodstuffs which are to be smoked, wherein it is possible to peel off the casing.

It is an additional object of the present invention to provide a tubular casing of regenerated cellulose, which has a fiber-reinforcement and which can be manufactured in a simpler manner from a web, namely at normal room temperatures, with shorter residence times and without the aid of acids and additional solvents.

It is also an object of the invention to provide a straight, essentially curvature-free and fold-free casing which has a seam and which, even under the action of water and on shrinking, retains its curvature-free and fold-free form even in the seam region, in spite of the relatively large thickness of the casing in this region.

Still another object of the present invention is to provide a peeling aid, which enables the casing to be removed from the contents more easily and more hygienically, without weakened points of the tubular casing having to be provided.

In accomplishing the foregoing and other objects, there has been provided in accordance with one aspect of the present invention a casing for foodstuffs, comprising a web material formed into a tubular casing by curving the longitudinally running edges of the web material around the longitudinal axis of the web material, meeting or overlapping the edges, and bonding the edges of a glued seam, wherein the web material comprises a fiber-reinforced regenerated cellulose comprising in the wet remoistened stage, in the longitudinal direction of the web material, a tensile strength at about 15 to 30 N/mm² and an elongation at break of about 30 to 50% and, in the transverse direction of the web material, a tensile strength of about 15 to 50%, the tensile strength in the transverse direction of the web material being equal to or greater than the tensile strength in the longitudinal direction of the web material; a layer comprising an essentially water-insoluble adhesion-promoting resin, located at least in the region of the glued seam; and an adhesive layer for bonding the edges, wherein the adhesive layer comprises passages and/or interruptions, and/or a sheet-like textile, a sponge material, a foam, a microporous sheet or a membrane for providing permeability to smoke.

In a preferred embodiment of the present invention, as described above, the longitudinally-running edges meet and are bonded by at least one film strip running parallel to the longitudinal axis and covering the two regions close to the edges wherein the adhesive layer is located between the film strip and the regions close to the edges and wherein the adhesive-promoting layer is located between the adhesive and the web material, wherein the material of the film strip is permeable to smoke and/or comprises a structure which is permeable to smoke.

In another aspect of the present invention, there is provided a process for the manufacture of a casing, comprising the steps of coating a fiber web with a viscose; coagulating and regenerating the viscose to produce a cellulose hydrate gel, wherein the web is gripped along its edges, at least during the coagulating and regenerating steps, to prevent shrinkage of the web; washing and drying the cellulose hydrate gel to free acid and salts from the cellulose hydrate gel; stretching the web during drying by 5 to 15% in the transverse direction, relative to the width of the fiber web before coating with the viscose; applying an adhesion-promoting layer, at least in the bonding region, to the fiber web; forming the fiber web into a tubular casing, wherein the edge regions are arranged in overlapping or butting arrangement; gluing the edge regions by means of a smoke-permeable film strip, wherein the film strip covers both of the edge regions; applying an adhesive to the surfaces to be glued of the web and/or film strip, wherein the adhesive is applied before, during or after the tube forming strip; and providing the adhesive and/or film strip and/or one or both of the edge regions with passages, wherein the passages are provided before, during or after the gluing step.

Above all, however, this casing has the surprising advantage that, under the action of heat and water, such as is the case, for example, when sausage casings are cooked and then cooled, it retains its straight, curvature-free form. This is particularly surprising and not forseeable, since it would normally be expected that, under the action of heat and water, the casing will assume a curved shape or expand unevenly or shrink and even tend to burst, because of the different wall thicknesses in the seam region, on the one hand, and in the remaining regions, on the other hand, and because of the different values of the strength, the water absorption capacity and the water retention capacity which are expected as a result thereof.

Further objects, features and advantages of the present invention will become apparent from the detailed description of the preferred embodiments which follows when considered with the attached drawings.

BRIEF DESCRIPTION OF THE DRAWINGS

In the drawings:

FIGS. 3, 4, 7, 8 and 9 are perspective views schematically illustrating alternatives for the manufacture of a tube from the web;

FIGS. 5a, 5b, 5c and 5d are detailed perspective views of sealing regions of the tube in sections transversely to the axis.

DETAILED DESCRIPTION OF THE PREFERRED EMBODIMENTS

Figure 1:
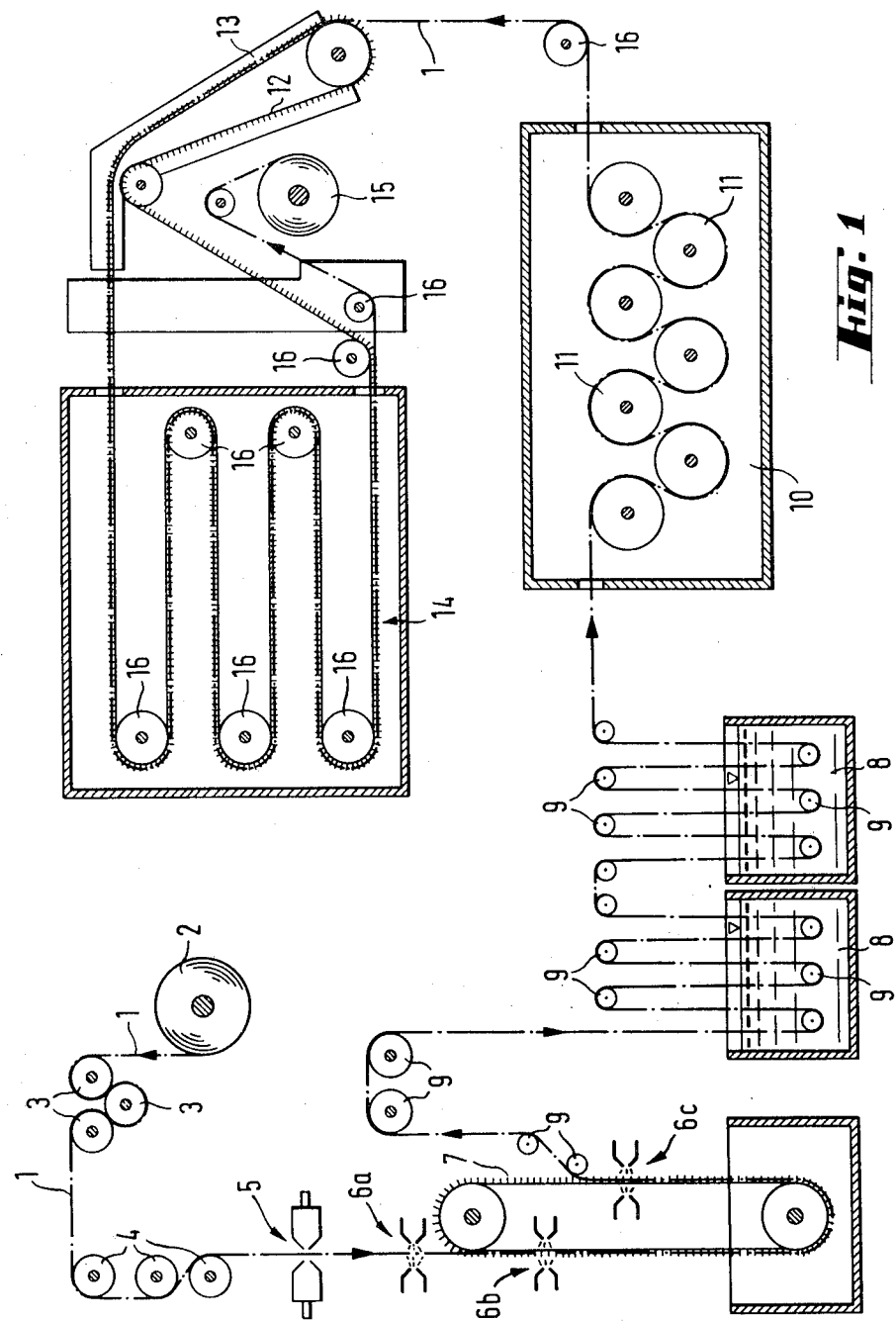
FIG. 1 schematically illustrates the manufacture of the fiber-reinforced web from regenerated cellulose.

According to the present invention, a sheet-like or web-like rectangular piece of film which is curved around its longitudinal axis, or a correspondingly curved, for example, continuous, film web, is converted into a tubular casing with a bonding seam running parallel to the longitudinal axis by overlapping and gluing the edge regions running parallel to the longitudinal axis. For simplicity, instead of "sheet-like or web-like pieces" and "continuous webs", only webs are referred to in the following text. The layer containing adhesive in the overlapping region can be in the form of a tape, filament or strip. It is also possible to bond the edge zones together in such a way that the edges are brought together flush, i.e., with the margins at least essentially butting, and are then bonded to one another by means of an adhesive and a tape, film or film strip, generally referred to as a "film strip", which covers the two edge zones. The film strip is then on the outside or inside of the tubular casing, or film strips running mutually parallel are used, of which one is then located on the inside and one is located on the outside of the tubular casing. A film strip can also be used when the edge zones overlap. Before producing the bonding seam, the adhesive layer is on the edge zones of the web, preferably on the surface of the film strip.

The film strip appropriately has a width of 5 to 15% of the tube circumference and preferably consists of the same material as the tubular casing, i.e., it consists of smoke-permeable fiber-reinforced cellulose hydrate, the strength values of the latter in the longitudinal and transverse directions being within the same range. If, however, no particular importance is attached to the curvature-free form of the tubular casing, it is also possible to use a perforated, needle-punched or perforated film strip of paper or a stretch-oriented plastic film, such as a film of polyester, a vinylidene chloride copolymer, polyvinyl chloride or polypropylene, or a composite film of two or more films, for example, laminated with an aluminum foil, or a smoke-permeable non-woven web, for example, an adhesively, mechanically or thermally consolidated non-woven fiber which comprises spun fibers, filaments or multiple filament yarns of a synthetic or natural material, which are deposited randomly or in an ordered fashion, or a smoke-permeable foam sheet having an open-pore or closed-pore foam structure, for example, of a polyurethane or polystyrene foam.

Microporous films which are permeable to smoke are also suitable, and these are also to be understood as membranes with a pore diameter such as that of membranes which are employed in reverse osmosis, ultrafiltration, dialysis, hemofiltration or as diaphragms for batteries or fuel cells.

Tapes of a close mesh fabric, network or lattice which, for example, are woven from filaments in the warp and weft are also suitable as film strips, for bonding the edge zones which are permeable to smoke. It is thus essential that, due to its structure or chemical composition, the film strip is capable of allowing the smoke to pass through the bonding seam of the tubular casing during smoking.

Preferably, however, compact film strips of material which is permeable to smoke, in particular the above-mentioned film strip of regenerated cellulose with fiber reinforcement, is used. In this case, it is then not necessary for the film strip to have an additional structure which is permeable to smoke, e.g., in the form of pores or perforations.

In addition, in the case of packaging casing, since it is intended to be used for foodstuffs which are to be smoked, the layer containing the adhesive is to be provided with a sufficient permeability to smoke, as described below.

Surprisingly, the film strip of fiber-reinforced regenerated cellulose, having the mechanical properties indicated for the tube material, can also be used as a tear-open tape for the tube filled with a filling, in particular for sausage casings, which are to be peeled off the contents without great effort. For this purpose, small incisions are made in the sausage casing immediately to the right and left adjacent to the film strip, for example, after the sausage has been initially cut, so that the film strip and the part of the casing sealed by means of the latter form a kind of gripping tab. Surprisingly, when this gripping tab is pulled, the sausage casing tears, in the direction of the longitudinal axis, to the right and left adjacent to the film strip.

The web is formed to give the shape of a tube, for example, either on a sufficiently long path, so that distortion and formation of folds do not occur, or by deflection over a shoulder-like forming tool. The two lateral edges of the web are adjacent, substantially without a spacing, or overlap. By means of transport elements gripping around the tube circumference, the tube is moved over the surface of a support body located in the interior of the tube. Before the seam is closed, the film strip is introduced, preferably with its tacky layer pointing in the direction of the inner surface of the tube, in such a way between the surface of the support body and the abutting edges of the web that the butt seam formed by the edges of the web forms the center line of the film strip, which covers both edge zones to substantially the same width. Gluing is effected, for example, by contact with a roller, it being advantageous to exert an additional pressure on the gluing position and/or to apply heat. The movement of the web and the gluing can take place cyclically or continuously.

Base materials which are used for manufacture of the packaging casing are webs of fiber-reinforced cellulose (cellophane, regenerated cellulose or cellulose hydrate). Thus, fiber-reinforced cellulose webs which have been manufactured by the viscose process (U.S. Pat. No. 3,884,270), by denitration of cellulose nitrate or hydrolysis of other cellulose esters, for example deacetylation of cellulose acetate with aqueous or alcoholic alkali solution (U.S. Pat. No. 3,546,209), can be employed.

The fiber-reinforcement is especially in the form of a web, for example a paper web, and usually it is composed of fibers such as are used in the manufacture of paper or rice paper, or of natural fibers, such as hemp fibers or flax fibers, or of synthetic fibers, such as polyamide fibers, polyester fibers or polyacrylonitrile fibers. The web-like fiber reinforcement is, for example, a textile structure, such as an adhesively, mechanically or thermally consolidated non-woven fiber which comprises spun fibers, filaments or multiple filament yarns of a natural or synthetic material, which are deposited randomly or in an ordered fashion, or it is a woven fabric, network, lattice, a knitted fabric or the like.

The fiber web is preferably treated on both sides with a viscose solution, preferably by immersion in a viscose solution or coating with a viscose solution, for example, using slot dies, rollers or spraying devices, and the viscose solution is then converted into regenerated cellulose. It is also possible to incorporate into the viscose from about 10 to 80% by weight of reinforcing fibers, which expediently have an average fiber length of about 0.05 to 15 mm. The fibers are composed of synthetic organic fibers, of natural fibers, for example cotton fibers, or of fibrids (U.S. Pat. No. 2,999,788). The viscose-containing fibers are then extruded through a die into the coagulation bath, whereupon a gel web is formed.

The viscose solution is an alkaline solution of sodium cellulose-xanthate and is usually prepared by reacting the alkali cellulose, which has been obtained from cellulose and sodium hydroxide solution, with carbon disulfide in an alkaline medium. In most cases, it still contains about 4 to 20% by weight of cellulose. After ripening, the viscose is applied to the fiber web and spun, i.e., coagulated. The spinning bath contains, for example, about 20 to 80 g/l of sulfuric acid, and also about 80 to 150 g/l of sodium sulfate and/or about 200 to 350 g/l of ammonium sulfate.

In further stages, the fiber-reinforced web-like product comprising a viscose gel is regenerated to cellulose hydrate gel in an acid medium, for example, in dilute (less than or equal to about 5% by weight) sulfuric acid, and the cellulose hydrate gel is washed with water to remove acid and salts, desulfurized, for example with sodium sulfite solution, optionally passed through a bleaching bath, and finally passed through a softening bath containing, for example, aqueous 5 to 20% strength glycerol, sorbitol or glucose solution (French Pat. No. 1,385,394).

The cellulose hydrate gel is converted into regenerated cellulose by intensive drying at about 90° to 140° C., and the regenerated cellulose is adjusted to a water content of about 5 to 15% by weight by conditioning. After drying, the fiber-reinforced cellulose hydrate webs have a thickness of about 50 to 200 μm, corresponding to a weight per unit area of about 50 to 250 g/m².

It is essential to the invention that the fiber web is held by the edges, so that shrinking of the web is prevented, in particular during the regeneration of the viscose and subsequently until the final drying process, but in some cases also even during the coating with viscose. The holding of the fiber web is effected, for example, by means of needle rollers, needle belts or needle chains which are formed in a single row or in several rows. These grip the two edges of the fiber web, so that the width of the web is kept constant during the entire process. The number of punctures in the edge zones is to be kept as small as possible, in order to minimize the reduction in the strength of the web. On the other hand, a sufficient number of punctures must be present in order to ensure adequate prevention of shrinkage. Chains of gripping clips or a cord-type guide of an acid- and alkali-resistant material, for example, of an appropriate plastic, can be used for holding the edges of the fiber web. In the case of the cord-type guide, the fiber web is held on both edges by means of one cord in each case, the edge being laid around this cord and being fixed by gluing or fusion under the action of heat, or by means of an adhesive. This cord runs, for example, in a guide rail. So-called expanding rollers can also be used for keeping the web broad.

A further essential process step comprises preventing shrinkage of the web, obtained from the cellulose hydrate gel, during the drying process and at the same time additionally stretching it in the transverse direction, preferably by about 5 to 15%, in particular by about 7 to 12%, relative to the original width of the fiber web. If a slight shrinkage of the web in the transverse direction has occurred during the regeneration, the extent of transverse stretching during drying is correspondingly increased. Before this stretching, pre-drying is carried out, if necessary, during which the major part of the water is removed until the gel web has a water content of about 80 to 150% by weight.

More extensive stretching transverse to the direction of the web is not carried out, and an actual longitudinal stretching step is likewise omitted. The shrinkage of the web in the longitudinal direction, which occurs during the process, in particular on coagulation, regeneration and drying, is compensated primarily by the drawing force which is exerted on the web in the longitudinal direction and which is required in order to pull the web through the individual treatment stages.

The strength values of the web in the longitudinal and transverse directions, which are reached due to the shrinkage-preventing measures and the transverse stretching during the drying process, are essential for the manufacture of the tubular casing with a longitudinal seam and for the film strip which is composed of the same material and is to be used for bonding the edge zones of the web.

The tensile strength and elongation at break are measured by means of an electronic tensile strength tester according to DIN 53,455. The tensile strength is to be understood as the resistance of the specimen to the tensile stress at the moment of breaking. It is measured as the tensile force (N), relative to the cross section ($mm^2$). The elongation at break is the percentage elongation of the specimen, as compared with the original length, under stress at the moment of breaking, and it is given in percent. The specimen has a length of 100 mm, a width of 15 mm and thickness of 100 to 110 $\mu$m.

In the case of a wet specimen of the web material according to the invention, that is to say a specimen which has been soaked in water at 40° C. for 30 minutes, the tensile strength in the longitudinal direction is about 15 to 30, in particular about 20 to 30 $N/mm^2$, and the elongation at break is about 30 to 50%, in particular about 30 to 40%. The tensile strength in the transverse direction is equal to but preferably greater than the tensile strength in the longitudinal direction, and it has values of between about 15 and 35, in particular about 25 to 35 $N/mm^2$. The elongation at break in the transverse direction is within the same range of values as that in the longitudinal direction, i.e., it is about 30 to 50, in particular about 30 to 40%.

In the case of a dried specimen of the web material of the invention, which has a residual moisture content of about 8 to 10% by weight of water and contains about 20 to 24% by weight of glycerol, the tensile strength in the longitudinal direction is about 50 to 70, in particular about 55 to 65 $N/mm^2$, and the elongation at break is about 10 to 22%, in particular about 12 to 15%. The tensile strength in the transverse direction is equal to but preferably greater than the tensile strength in the longitudinal direction, and it has values of between about 50 and 75, in particular about 65 to 75 $N/mm^2$. The elongation at break of the dried specimen is about 8–19%, in particular about 8 to 12%.

Adhesion promoters, with respect to adhesives, are to be understood, as is known, as substances or mixtures of substances, which are applied to one or both of the gluing surfaces before application of the adhesive, in order to improve the adhesion between the adhesive and the gluing surfaces. In the present case, the adhesion promoters anchor the layer of adhesive to the web and/or to the film strip in a wet-resistant manner, if this is required. An adhesion promoter is used, in particular, if the adhesive is a pressure-sensitive adhesive, being located between the adhesive layer and the web and, if necessary, between the adhesive layer and the film strip. Preferably, the adhesion promoter is a water-insoluble, cured, cationic thermosetting resin. Polyurethane resins, nitrocellulose and other compounds known as water-insoluble anchoring agents can also be used.

Although in principle the adhesion-promoting layer of resin would only have to be present in the region of the surfaces of the continuous web, which are to be glued, it is expedient for industrial reasons to provide the entire area of one surface, and for certain applications or overlapping gluings even both surfaces, of the web with one or two different adhesion-promoting layers of resin, provided there is adequate permeability to smoke.

In addition, the web can also have, on the surface which later forms the inside of the tubular casing, a customary agent for improving the ease of peeling off the tubular skin. These agents include, for example, water-soluble proteins, such as gelatin, egg albumin and glutenin. However, these agents are only necessary with specific adhesion-promoting resins; if cured, cationic thermosetting resins are present on the inside of the tubular casing, an adequate ease of peeling off is already ensured without an additional agent. Moreover, these resins have the advantage that, surprisingly, they are adequately permeable to water vapor and smoke, even without additional measures.

Preferably, the fiber-reinforced web of cellulose hydrate is coated with an aqueous solution which contains up to 25% by weight of a dispersible, thermosetting cationic resin, and the coated material is heated to 65° to 125° C. until the moisture content is less than 10% by weight. The resin is cured to its water-insoluble form by heating, and is permanently bonded to the surface of the web. Preferably, in the manufacture of the fiber-reinforced web of cellulose hydrate, the coating solution is applied to the already regenerated but not yet dried gel web. This application can be effected prior to, simultaneous with or subsequent to the treatment of the gel web with a softener, e.g., a polyol. The resin layer has a weight per unit area of about 30–300 mg/m$^2$, preferably 40 to 75 mg/m$^2$.

Lower aliphatic or aromatic hydrocarbons, lower alcohols or esters or mixtures of these solvents are employed as suitable solvents for the thermosetting resin. It is advantageous to use an aqueous solution or dispersion.

If desired for certain applications, an additional water-repellant resin, such as paraffin, montan wax or carnauba wax, and/or suitable thickeners, such as cellulose ether or starch, are applied to the web together with the thermosetting resin.

The tubular casing can also be printed with labelings or decorative patterns before, but preferably after application of the thermosetting resin and before the gluing. Advantageously, in addition to the printing processes customary in the manufacture of seamless sausage casings, other printing possibilities are also available since, in the present case, the flat web can be printed before shaping of the tube.

The coating of thermosetting resin is, for example, free from pigments and organic dyes and thus forms a clear layer through which any printing remains clearly visible. However, it is also possible to use a transparent organic dye, in order to impart a corresponding color to the packaging casing.

If appropriate, in addition to the thermosetting resin, the layer on the tubular casing can contain pigments, a plasticizer for the thermosetting resin and/or a curing agent for the thermosetting resin. The thermosetting resin and the plasticizer are taken up in a suitable liquid solvent or dispersing agent, which advantageously can be evaporated off at a temperature at which at least precuring of the resin can start at the same time.

A non-exclusive list of examples which may be mentioned for the thermosetting resin includes: urea/formaldehyde, melamine/formaldehyde and phenol/formaldehyde resins. Preferred plasticizers used for these thermosetting resins are soft, non-curing resins of the alkyd type, or dibutyl phthalate, tricresyl phosphates or dibutyl sebacate.

Curing agents which can be employed for thermosetting resins are, for example, ammonium thiocyanate, toluenesulfonic acid, maleic acid or lactic acid. These compounds act as catalysts in the curing of the thermosetting resins.

Particularly preferred thermosetting resins are condensation products of polyamide-polyamines or aliphatic polyamines or of polyamides with bifunctional halohydrins or derivatives thereof, for example, ephichlorohydrin, such as are described, for example, in U.S. Pat. No. 2,573,956 or in British Pat. Nos. 865,727 and 908,205, the disclosures of which are herein incorporated by reference. A particularly suitable resin is, for example, the reaction product of an aliphatic 2,6-polyamide, diethylenetriamine and epichlorohydrin.

Possible polyamines are simple alkylenediamines or polyalkylene-polyamines, for example diethylenetriamine, triethylenetetramine, tetraethylenepentamine and the corresponding polypropylenepolyamines, and polybutylene-polyamines, such as dibutylenetriamine. To manufacture the corresponding chlorohydrin resins, the polyamines are reacted with more than one mole of epichlorohydrin per mole of polyamine. In general, about 1.5 to 4 moles of epichlorohydrin, usually about 2 to 3 moles, are used. The reaction is carried out in an aqueous solution at a moderately elevated temperature (e.g., about 50° C.), until the desired degree of viscosity is reached. Reaction products of epichlorohydrin and dipropylenetriamine or bis-(3-aminopropyl)-methylamine are preferably used, with about 2.8 to 3.8 moles of epichlorohydrin being reacted with 1 mole of polyamine.

The polyamide-polyamines are condensation products of a saturated, aliphatic, dibasic acid which has about 3 to 8 carbon atoms in the molecule and one of the above-mentioned polyamines which has at least one secondary and two primary amine groups, such as the above-mentioned polyalkylene-polyamines. Diglycollic acid, succinic acid, glutaric acid and adipic acid are preferably used as the dibasic acid. It is also possible to use mixtures of dibasic acids. The mixtures of the acids can also contain acids with more than 8 carbon atoms in the molecule, as long as the proportion of these acids in the mixture does not prevent the polyamine-polyamide manufactured therefrom from being truly soluble or at least colloidally soluble in water. A proportion of the polyamines which are reacted with the dibasic acid can be replaced by alkylenediamines. The proportion of the latter can be up to about 30%. The reaction between the polyamine and the dibasic acid is carried at about 110° to 250° C., in most cases, at about 160° to 210° C. About 0.8 to 1.4 moles of the acid are used per mole of polyamine. The resulting polyamine-polyamides are reacted in aqueous solution at about 50° C. with about 0.5 to 1.8 moles of epichlorohydrin per secondary amino group, and about 0.9 to 1.5 moles of epichlorohydrin are preferably used.

The resin is applied, in an aqueous solution which contains about 0.3 to 2% by weight, preferably about 1 to 1.3% by weight of chlorohydrin resin, to the web intended for coating, preferably to the still moist, not yet dried cellulose hydrate gel web. However, it is also possible to apply the aqueous solution after the cellulose web has been dried, which indeed has the advantage that solutions with a lower resin content are required to obtain the same effect, but sometimes this leads to uneven impregnation. After application of the aqueous solution of the anchoring agent, the web is dried at a moderate heat (e.g., about 100° C.).

The permeation properties of the packaging casing in the gluing region are not at all or are not significantly influenced by the anchoring layer of cured, cationic, thermosetting resin. These properties are of particular importance for the permeability to water, water vapor and smoking fumes, if the tubular casing is used for long-life sausages or smoked cooked sausages. If the permeability were too low, for example, the typical reddish-brown color shade of smoked sausage meat would not be obtained.

The adhesive is applied either directly in the form of an emulsion, dispersion or solution, for example in water, hydrocarbons of boiling range 65° to 95° C., e.g., gasoline, acetone, ethyl acetate, toluene, chlorinated hydrocarbons or in solvent mixtures, for example acetone/gasoline, or as a melt, to the overlapping areas of the web. However, it is also possible initially to apply a thin film of the adhesive layer to a carrier tape which is composed of a material provided with an anti-adhesive finish, for example, a material of silicone paper or of siliconized plastic film. The adhesive is then transferred to the overlapping areas and the carrier tape provided with an anti-adhesive finish is then applied off from the adhesive film. If a film strip is used for bonding the edge regions of the edge zones of the web which run parallel to the longitudinal axis, the adhesive is advantageously first applied to the film strip. The film strip is then pressed onto the edge zones in order to glue the edge zones to the adhesive layer. In a further variant, the film strip itself is composed of a material suitable for gluing, for example, of a sealable thermoplastic material, so that it is not necessary to apply an adhesive layer to the film strip.

It is also possible to use a film strip, for example, of polyester or in particular of fiber-reinforced cellulose hydrate, with an adhesive coating on both sides. One of the two tacky surfaces of this film strip is glued, in the direction of the longitudinal axis, to the entire surface of one of the two edge zones of the continuous web which run parallel to the longitudinal axis, while the other tacky surface of the film strip is, if appropriate, still covered with a protective tape which can be pulled off. The tube is then shaped, with overlapping of the two edge zones of the web which run parallel to the longitudinal axis, the film strip being in the overlap between the edge zones. After the protective tape has been pulled off from the second tacky surface, this surface is glued to the second edge zone.

The surface of fiber-reinforced regenerated cellulose, which is to be provided with the adhesive layer, is in the pre-dried state, dried state or re-moistened state, when the adhesive is applied, and advantageously contains an anchoring agent. After application, the dispersing agent or solvent is removed, for example, by heating with hot air. Usually, the web is dried down to a moisture content of less than about 15% by weight, preferably about 5 to 10% by weight. A coating thickness of the adhesive layer in the range from about 0.02 to 0.5 mm is in general sufficient. The preferred thickness of the adhesive film is about 20 to 150 $\mu$m, in particular about 25 to 50 $\mu$m.

The total width over which the adhesive is applied is chosen between about 3 to 70 mm, depending on the desired strength values and gauges, and is advantageously about 5 to 15% of the later circumference of the casing. If a film strip is used for the overlapping bonding of a butt seam formed from the edge zones, it is correspondingly necessary for the adhesive to be applied over an area twice as wide.

In contrast to coating of the web with the adhesion-promoting resin, the adhesive is not applied over the entire area of the web, but only in the desired gluing region, i.e., along the two edges running parallel to the longitudinal axis and/or to the surface of the film strip.

However, it has been found that a layer of adhesive applied in the customary manner usually does not ensure sufficient permeability to smoke. After smoking, glued tubular casings, filled with sausage meat, of fiber-reinforced regenerated cellulose exhibit no smoked color, or only an incomplete smoked color, in the region of the completely glued seam.

It is known that the smoked coloration arises by reaction of phenols and carboxyl compounds with proteins, the intensity and stability depending, in particular, on the water content of the casing, the pH value of the substrate and the duration and level of heating. It must therefore be possible for the volatile carboxylic acids which form the main component of the smoke and are particularly decisive for the coloration to pass through the seam region of the tubular casing.

In order to improve the permeability to smoke, it is therefore necessary to apply the layer of adhesive to less than the entire surface of the web or the film strip, to provide interruptions or gaps. The layer of adhesive can also be applied in strips, spirally or as a punctiform screen pattern, for example, with a profile roller which imparts a structure to the adhesive layer. The applicator roller can also have a textile structure or a brush surface. It is also possible, using several nozzles which move back and forth transversely to the web, to force the adhesive out onto the moving web, producing a wavy pattern of stripes of adhesive layer.

Particularly advantageous is the application of a dispersion of adhesive, for example, in a regular punctiform or linear grid structure, by rotary screen printing or gravure printing, which can be carried out at a rate of up to about 100 m/minute. The layer thickness of the adhesive of about 25 to 30 $\mu$m with a surface coverage of about 40 to 60% results in excellent permeability to smoke, coupled with sufficient strength of the bonding seam. The same effect is obtained with orifices, pores or perforations in the layer of adhesive and, if appropriate, also in the edge regions of the web and of the film strip, it also being possible for the diameter of these passages to be in the micrometer or nanometer range. These orifices, pores or perforations can be produced mechanically, before or after making the tubular shape or glued seam, for example by stamping, embossing, hole-punching or needle-punching the edge zones and/or film strip provided with the layer of adhesive, the diameter being about 0.7–1.2 mm. Suitable passages can also be produced by chemical means, for example by partially dissolving the layer of adhesive away from the edge zones or from the film strip before forming the glued seam.

It is furthermore possible to incorporate into the adhesive a pulverulent substance which can be extracted, for example, a polymer, such as starch, polystyrene or sugar, or a salt, for example, sodium chloride or sodium bicarbonate, and which, after application of the adhesive to the film strip or to the edge zones of the web which run parallel to the longitudinal axis, is dissolved out, to form pores in the layer of adhesive. It is also possible for an additive which is permeable to smoke, for example a porous substance or organic pigments with a high permeability to smoke or gas, to be admixed to the adhesive. Precipitation reactions such as are known for the manufacture of microporous films and membranes can also improve the permeability of the layer of adhesive to smoke or gas. For this purpose, the adhesive is mixed in two volatile, mutually miscible solvents, the mixture is spread onto a carrier film or onto the edge zones to be bonded and the solvents are volatilized, whereupon the polymeric material coagulates, forming a porous structure. The adhesive or the polymeric parts of the adhesive are sparingly soluble or insoluble in one of the solvents. Alternatively, it is also possible for the adhesive to be dissolved or dispersed in a solvent and, for example, after application to the bonding surfaces of the web, for the solution to be treated, for coagulation, with a liquid precipitant which is miscible with the solvent. In order to improve the permeability to gas and smoke, it is also possible to add, to the layer of adhesive, finely pulverulent thermoplastics which form a microporous structure in this layer at elevated temperature by sintering. The permeability of the layer of adhesive to gas and smoke can also be improved by adding gases, for example, air, nitrogen, carbon dioxide or fluorinated hydrocarbons, in the form of small bubbles which are expanded, if appropriate, under the influence of heat. This layer is sprayed, for example, onto the edge zones of the web or onto the film strip. The gas can also be produced by adding an agent which forms, for example gas azo compounds of carbonates, under the influence of heat.

The layer of adhesive may also, in some cases additionally, contain a textile sheet-, strip-, chain- or filament-like structure, for example an adhesively, mechanically or thermally consolidated non-woven fiber web which comprises spun fibers, filaments or multiple filament yarns of natural or synthetic material, which are deposited randomly or in an ordered fashion, or a woven fabric, network, lattice or the like or a sponge or foam film, in particular with an open-pore structure.

Surprisingly, the embodiments described for the tubular casing with a good permeability to smoke in the gluing region are sufficiently stable and have a sufficient resistance to mechanical and thermal stress.

The adhesive used is preferably a mixture of substances, which sets without a chemical reaction. This includes hot-melt adhesives which are solvent-free, and likewise adhesive solutions, the solvents of which are, however, already allowed to escape before gluing. The latter include, in particular, heat-sealing adhesives, contact adhesives and pressure-sensitive adhesives. An essential condition is that the adhesive is physiologically acceptable.

Hot-melt adhesives are non-curing, fusible thermoplastic resins which are solid at room temperature and which are temporarily melted during the bonding process, without suffering any chemical change. After cooling and solidification, they firmly adhere to the surface of the substrate. The polymeric raw materials used are above all ethylene/vinyl acetate copolymers, in particular those having a vinyl acetate content of about 18 to 40% by weight, preferably about 30%, and a melt index of about 4 to 500, in particular about 40 to 400. A non-exclusive list of examples which may be mentioned for the polymeric raw materials are: low-molecular polyethylenes, atactic polypropylenes, ethylene/acrylate copolymers, copolymers containing carboxyl groups, styrene/butadiene block copolymers and styrene/isoprene block copolymers, fusible aliphatic or aromatic polyesters, for example those which have low branching and contain hydroxyl groups, polyurethanes, polyamide resins, in particular those having a relatively low melting point and melt viscosity, and polyaminoamides are also suitable as the base resin for the hot-melt adhesive. In addition to these resins, these adhesives usually also contain resins, such as balsamic resins, colophony derivatives, hydrocarbon resins, waxes or paraffins, oxidation stabilizers, plasticizers, pigments and/or fillers.

Those hot-melt adhesives are preferred which can be processed at a relatively low temperature, e.g., at about 140° to 170° C. On the other hand, they must be resistant to boiling, insensitive to hydrolysis and sufficiently flexible.

Heat-sealing adhesives are those which, like the hot-melt adhesives, are thermally activated on bonding. They are usually applied in the form of solutions, dispersions or emulsions in water or organic solvents to at least one of the two surfaces which are to be sealed to one another. The set, solvent-free layer should not be tacky, but should melt only during sealing as the result of the heat supplied and should solidify again on cooling. In this case, a coating is sealed against a coating, or a coating is sealed against an anchoring layer.

The raw materials used are copolymers of vinyl chloride or of vinylidene chloride, in solution or in dispersion with an addition of resins and other polymers. Copolymers of vinyl acetate and polymethacrylates, polyurethanes and polyesters, in particular ethylene/vinyl acetate copolymers, vinyl acetate/vinyl chloride copolymers, polyamides and polyethylene are also used.

When a sealable thermoplastic material is used, this is in particular a vinylidene resin which is present with a weight per unit area of usually about 3 to 12 g/m$^2$. These materials include film-forming resins which are obtained by copolymerization of monomers, at least one component containing a vinylidene group.

In general, film-forming vinylidene resins can be used which contain at least about 5% by weight, but preferably at least about 80% by weight of vinylidene chloride in the polymerized molecule. The following non-exclusive list of examples may be mentioned as co-monomers: Vinyl chloride, vinyl bromide, vinyl acetate, vinyl propionate, vinyl chloroacetate, alkyl acrylate or methacrylate, such as, for example, the methyl, ethyl, propyl, butyl, isobutyl, methoxyethyl or chloroethyl acrylates or methacrylates, methyl vinyl ketone, methyl isopropenyl ketone, acrylonitrile, methacrylonitrile, styrene, vinylnaphthalene, ethyl vinyl ether, butyl vinyl ether, N-vinylphthalimide, N-vinylsuccinimide, N-vinylcarbazole, diethyl methylene-malonate, unsaturated organic acids, such as itaconic acid, or mixtures of these compounds. In addition to vinylidene chloride, the copolymer can contain one to three of these monomers.

These adhesives can also contain customary waxes, for example, those based on esterified montanic acids, polyolefine waxes or those based on oxazoline, and/or customary fillers, for example, kaolin, in particular kaolin which has been rendered hydrophobic, silica or calcium carbonate (chalk) having a preferred mean grain size of about 1 to 3 $\mu$m.

Moreover, customary additions of plasticizers, for example, esters of phthalic acid, such as dibutyl phthalate, esters of citric acid, such as tributyl acetylcitrate, of sebacic acid or of tartaric acid, such as diisobutyl tartrate, are used.

Sealing is effected, for example, by contact with a sealing jaw or roller, which is preheated to a predetermined temperature. However, any other heat source can also be used for sealing, for example, IR radiators, high-frequency heating or hot air. In many cases it is advantageous to additionally exert a pressure on the sealing position, for example by pressing with a heated roller. The sealing temperatures and pressures used largely depend on the material properties of the sealing layers. In practice, those sealing layers will usually be preferred which, in the temperature range from about 120° to 150° C., give bonding means which withstand the stresses occurring in practice.

Contact adhesives must be applied to both surfaces to be bonded. The layers of adhesive are made to stick only after the solvents have almost completely evaporated off. For bonding, a brief contact pressure which, however, is as high as possible, is necessary. These adhesives are usually composed of types of synthetic rubber, mixed with resins, or of high-molecular polyurethane elastomers.

A pressure-sensitive adhesive is in general understood to be a permanently tacky substance which, in a form free from solvent or dispersing agent, spontaneously adheres to the surfaces of most materials, even under a light contact pressure.

Raw materials for the pressure-sensitive adhesive are preferably polyacrylates or polymethacrylates, but in principle other pressure-sensitive adhesives are also suitable, as long as they fulfill the requirements made of them, which include good resistance to boiling and physiological acceptability. Dispersion-type pressure-sensitive adhesives, for example, those based on polyacrylates or vinyl acetate copolymers, are also suitable in principle, but whether these pressure-sensitive adhesives can satisfactorily meet the requirements made of them must be examined in each individual case. These pressure-sensitive adhesives may additionally contain suitable resins, or hot-melt pressure-sensitive adhesives which, in addition to suitable resins, contain ethylene/vinyl acetate copolymers and styrene/butadiene or styrene/isoprene block copolymers.

The pressure-sensitive adhesive is composed of a highly polymeric base resin which determines the cohesion properties and the specific adhesion, and usually one tackifying resin which can also be replaced by low-molecular fractions of the base polymer. Such a resin is predominantly added in dissolved form to the base resin. The following resins, for example, can be used: naturally occurring resins, such as balsam resins, modified naturally occurring resins, for example those based on hydroabietyl phthalate or esters of colophony, and polyterpene, terpenephenol, coumarone, indene, ketone and hydrocarbon resins. The addition of tackifying resins indeed increases the surface tackiness and peel strength, but in some cases a reduction in cohesion can thereby occur. To increase the cohesion and the heat distortion resistance and shear resistance of the gluing, it is, for example, possible for the base resin, after it has been applied to the bonding film strip or to the surface of the web, to be crosslinked, for example with chemical additives at room temperature or thermally by warming to about 130° to 140° C. for about 5 to 15 minutes, in which case a considerably improved resistance of the glued seam to hot water can also be obtained. For this purpose, it is necessary for crosslinking agents, which undergo a crosslinking reaction with reactive groups of the polymer, to be added to the adhesive, or a homopolymer or copolymer in which reactive, i.e. crosslinkable, co-monomers which have functional groups, for example carboxyl, amide, amino, methylol or hydroxyl groups, and which improve the adhesion properties and/or permit limited crosslinking of the adhesive film can be copolymerized, is used as the base resin. In general, these components with functional groups are indeed advantageous, since they increase the cohesion of the pressure-sensitive adhesive film, but they are not absolutely necessary. A non-exclusive list of examples of such copolymers which may be mentioned are: anionic copolymers of acrylates, vinyl acetate, an unsaturated carboxylic acid, such as acrylic acid, methacrylic acid or itaconic acid, and a glycidyl compound, such as glycidyl acrylate or glycidyl methacrylate, copolymers with bifunctional monomers, such as triethylene glycol dimethacrylate or diacrylate, tetramethylene glycol diacrylate or dimethacrylate, copolymers of acrylates, vinyl 1-halogenocarboxylates, such as, for example, vinyl chloroacetate, 1,2-unsaturated carboxylic acids, such as acrylic acid, or unsaturated dicarboxylic acids, and, as the 4th component, a polymerizable unit containing hydroxyl groups, and copolymers of N-methylolacrylamide (or N-methylolmethacrylamide) and acrylates (or methacrylates) which still contain free non-esterified carboxyl groups, this copolymer being crosslinked thermally, with elimination of water. Furthermore, the N-(1,1-dimethyl-3-oxo)-butylacrylamide $CH_2=CH-CO-NH-C(CH_3)_2-CH_2-CO-CH_3$ is also used as a reactive co-monomer. The double bond permits copolymerization, while the keto group and the H atoms adjacent to the keto group enable the crosslinking reaction to take place. Crosslinking can be initiated by heating with peroxides. A suitable crosslinkable pressure-sensitive adhesive contains, for example, a copolymer based on acrylates with the additional use of acrylonitrile and monomers which contain carboxyl groups and which are already crosslinked in the cold, i.e., at room temperature, when alkalis or salts of monovalent or polyvalent metals are added, for example, ammonia, an alkali metal hydroxide solution or an aluminum salt. Other co-monomers which may be mentioned include acrylic acid hydrazides and acrylate hydrazones in copolymers containing acrylates.

For the tubular casing of fiber-reinforced cellulose hydrate, polyacrylates are particularly advantageously used as the pressure-sensitive adhesives, the acid groups being esterified with one or several aliphatic alcohols having 1 to 12 carbon atoms, in particular having 4 to 8 carbon atoms, for example, butyl alcohol or 2-ethylhexanol.

The pressure-sensitive adhesive layer can also contain other non-tacky additives, such as are customary per se in adhesives, for example, highly viscous thickeners based on homopolymers or copolymers of polyacrylic acid salts or polyvinylpyrrolidone, preservatives, in order to protect the adhesive layer from attack by microorganisms, wetting agents, plasticizers, for example, based on phthalates obtained with straight-chain alcohols (butanol) or branched alcohols (2-ethylhexanol), fillers, such as kaolin, glass beads, chalk, quartz flour, microdolomite, barite, fine-grained sand and zinc oxide, and pigments and organic and inorganic dyes in the form of powders or flakes.

Bonds produced with pressure-sensitive adhesives can, as is known, be separated and joined together again several times. It is therefore completely surprising that precisely these adhesives in combination with one of the above-mentioned adhesion-promoting resins, as the priming layer, form a sufficiently strong seam when webs are glued to form tubular casings. Especially during the manufacture of sausages, at which time the seam is exposed to hot water at about 80° C. for a relatively long period while the sausage is cooked, and during filling, twisting off, tying off or clipping and the like, when the seam must withstand high mechanical loads and stresses and changes in dimensions occur, it has been found that this combination of fiber-reinforced cellulose web, adhesion-promoting resin and pressure-sensitive adhesive is especially advantageous, particularly because of the elastic character of the latter. Thus, because they are permanently tacky, the pressure-sensitive adhesives have the advantage that the parts which are to be bonded can be glued together rapidly and simply, with sufficient adhesive strength against shearing forces. Shearing forces are to be understood as the action of tangential tensile forces on the glued seam, perpendicular to the longitudinal axis of the tubular casing.

As has been found, the tensile strength of glued areas of about 35 to 45 N/15 mm of sample width is in the same range as the tensile strength of the material of the tubular casing in the transverse direction.

For packaging meat products in the form of sausage compositions, shirred, seamless tubular casings are used, as is known, which progressively unfold as the sausage composition is forced in. These shirred casings, also called concertinas or hollow rods or sticks in the trade, have hitherto been manufactured from long, seamless tubes which are conveyed in the direction of their longitudinal axis and are shirred against an opposing force, the length of the shirred casing usually being only about 1 to 3% of the original unshirred length.

The tubular casing according to the invention can also be shirred. This is particularly surprising since, because of the thickening in the sealing region as a result of the film strip covering the two edges, difficulties were to be expected during shirring. The tubular casing is shirred, for example, by the process known from U.S. Pat. Nos. 3,988,804 and 4,185,358, the disclosures of which are incorporated herein by reference, and by means of the equipment described therein.

A shirring ratio of about 1:70 to 1:80 can readily be achieved.

A helical twisting of the casing and consequently, twisting of the relatively thick seam zone about the longitudinal axis of the casing during the shirring process are also possible, but not necessary. This is effected, for example, by shirring devices known per se such as are described, for example, in U.S. Pat. Nos. 2,819,488, 3,619,854, 3,594,857 and 3,766,603, the disclosures of which are incorporated herein by reference. The number of turns per 10 m of tube length is approximately between about 0.5 and 10, and is chosen according to the degree of thickening in the seam zone and the width of the film strip.

The shirred tubes are filled (about 20 m/minute) with a sausage meat of the cooked sausage type, twisted off mechanically, simmered at about 70° to 80° C., smoked and cooled with water.

Sausages are obtained which have a uniform shape and a skin which can be peeled off and which lies close against the sausage mixture.

If, for example, the tubular casing is envisaged for sensitive foodstuffs, the web or the tubular casing is sterilized, customary methods being applied, for example, heat treatment or ozone treatment, or high-frequency irradiation. In addition to the advantages already mentioned, it should also be pointed out that the tubular casings of the invention can be produced at a higher speed than hitherto possible. In the case of the manufacture of webs of regenerated cellulose by the viscose process, the spinning process can be carried out more rapidly, as can coating of the webs with the water-insoluble resin and printing. Moreover, the casing comprises an even, uniform coagulated and regenerated layer of cellulose.

In addition to flexographic printing, high-grade gravure printing is also possible. Furthermore, the piece or web can be printed with an all-round print or with a front and back print.

The flavor of the sausage composition is not affected when the casing is used as a sausage casing. The sausage casing and the glued seam exhibit high resistance to elongation stresses and volume stability during filling with sausage composition, handling and processing. Surprisingly, the pressure, arising on filling and the swelling and shrinking forces arising on cooking and cooling, do not cause any damage to the seam, although the adhesive layer is not present over the entire surface or is porous. The sausage casing can also be stored at low temperatures and can easily be cut open, for which the film strip can be used as a tear-open tab.

The invention will now be explained in more detail with reference to FIGS. 1–9 of the drawings.

A web 1 of long-fibered hemp paper is unwound from a roll 2 and, after passing through drawing rollers 3 and through rollers 4 which control the edges of the web, are coated on both sides with viscose by means of a flat-web coater 5.

Subsequently, for precipitation and regeneration, the web 1 passes along spray nozzles 6a, 6b and 6c, from which regeneration fluid is applied to the web provided with viscose. The web width is kept constant by means of the needle chains 7 engaging on the two edges of the web, so that the shrinkage in the transverse direction, which usually occurs on regeneration, is prevented. The fiber-reinforced web of cellulose hydrate gel then passes through the washing, desulfurization and plasticizing baths 8 shown diagrammatically, being guided over rollers 9. Predrying of the web takes place in the drying section 10 in which the web runs over drying rollers 11. The edges of the web are then gripped by needle clip chains 12 and the web is led through a tenter frame 13 and subsequently through several decks of a drying field 14 and wound onto roller 15. The further rollers 16 are used in most cases for deflecting the web and/or the clip chains.

Figure 2:
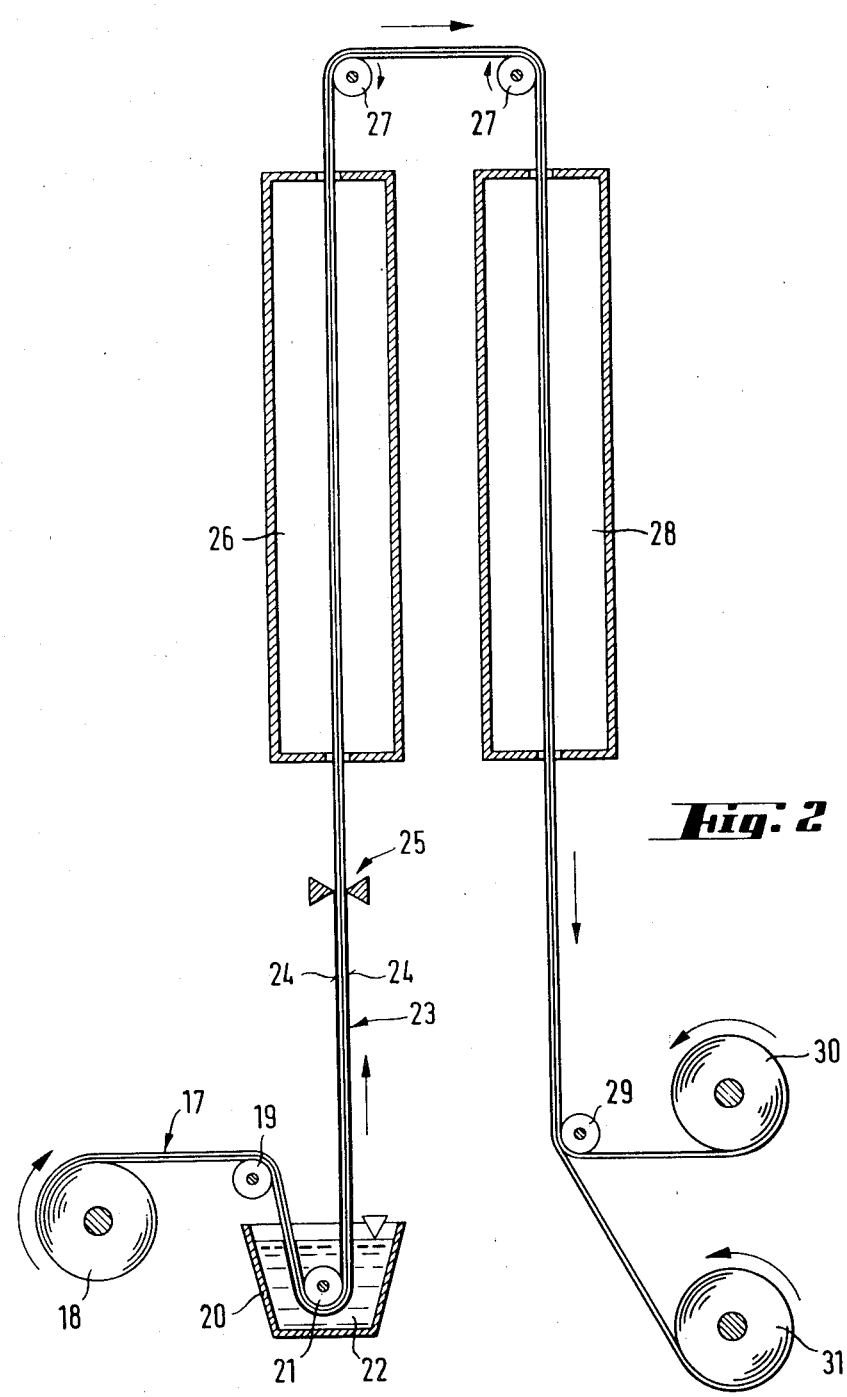
FIG. 2 schematically illustrates the coating of the fiber-reinforced web of regenerated cellulose with an anchoring layer.

The application of the anchoring layer to the web is explained by way of example in FIG. 2.

The two-ply web 17, unwound from the stock roll 18, is passed, after running over the deflection roller 19, at a steady speed through a trough 20 over a deflection roller 21 located in the trough. The trough 20 contains the coating 22.

The two-play web 23 having the fluid coating 24 on the outside passes in an upward vertical direction through the gap which is formed by the blade 25 or by so-called doctor rollers and which sets a defined thickness of the coating on the surfaces of the web. The web is then led through the drying shaft 26 in which the liquid fractions of the coating are evaporated by the action of heat. After the deflection rollers 27, a second drying shaft 28 follows, which can also be used for reconditioning the web. At the deflection roller 29, the two plies are separated and are then wound up on the stock rolls 30 and 31.

In place of the coating of a two-ply web as shown in FIG. 2, one-sided coating using conventional coating devices is also possible but is not shown.

A tube is then formed from the web provided with the anchoring layer, as shown, for example, in FIGS. 3, 4, 7, 8 or 9.

Figure 3:
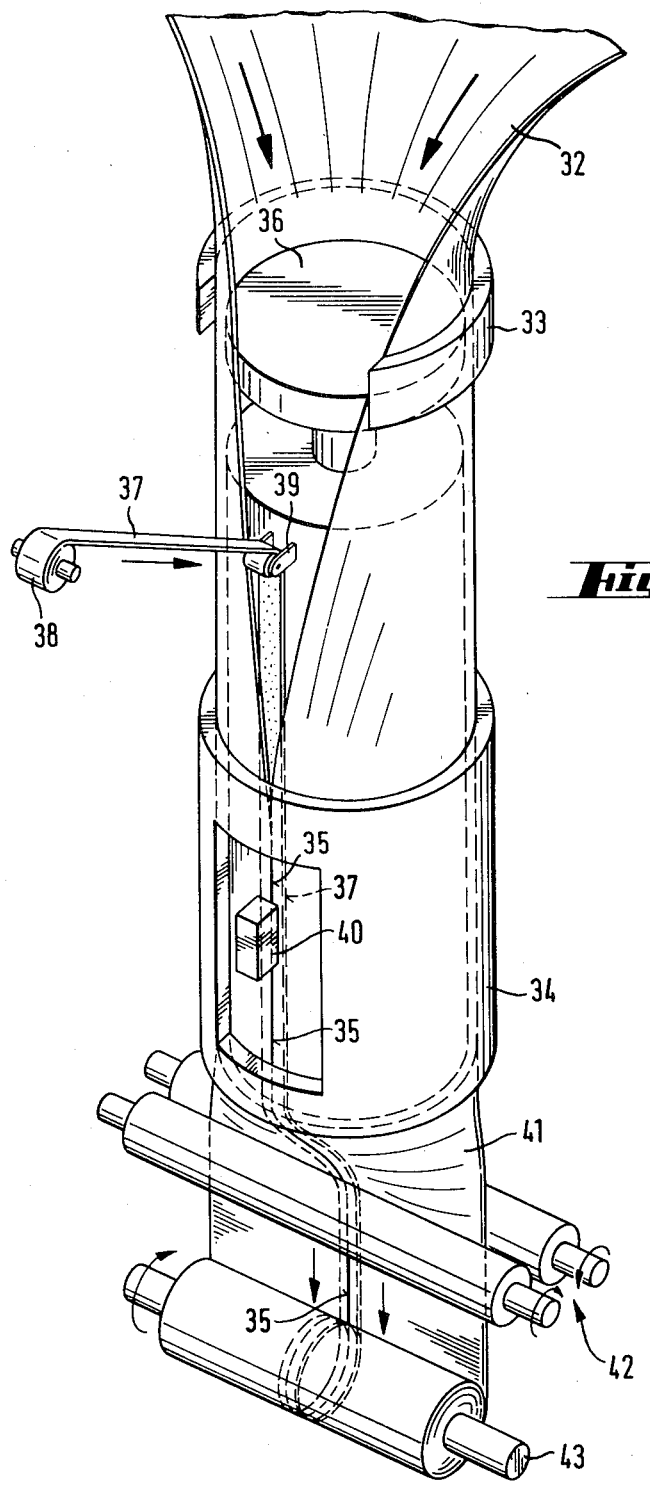

Referring now to FIG. 3, the fiber-reinforced web 32 of regenerated cellulose is passed through a ring segment 33 and shaped into a tube, the two edges approaching one another in the guide sleeve 34 to give a butt seam 35. The ring segment 33 and the guide sleeve 34 serve to assist the formation of the tube from the outside, while the cylindrical support element 36 located in the interior of the tube supports the tube from the inside. A film strip 37, composed of the same fiber-reinforced material as the web, is unwound from the roll 38 and passed via an eye-type holder 39 into the interior of the tube, the butt seam 35 being in the center of the film strip 37. For bonding of the two edges of the web, there is a smoke-permeable adhesive layer on the surfaces of the film strip. For this purpose, the adhesive layer was provided continuously, for example by means of a needle roller, with fine through-holes. The adhesive can also be applied in the form of a dispersion or solution to the film strip by means of screen printing with the use of, for example, a 40 mesh-perforated stencil and a spreading blade, the adhesive layer being present, after stripping off the solvent or dispersing agent, in the form of areas having a circular cross section.

The jaw 40 which is heated when a sealing layer or a hot-melt adhesive is used and which can, for example, also have the form of a contact pressure roller, then presses the film strip 37 against the edge zones of the web which has been shaped into a tube. If appropriate, a gas-permeable adhesive layer is also present on the web surface which forms the inside of the tube. The tube 41 is drawn off by the pair 42 of rollers and is wound up by means of the roll 43.

In place of the support element 36 in the interior of the tube formed, it is also possible for a filling, for example sausage meat, to be present in the tube. The filling issues from a filling pipe of a filling apparatus at the same rate as that of the forward movement of the tube. Preferably, the filling pipe ends coaxially in the interior of the tube. Moreover, it is also possible to design the support element 36 as a filling pipe. In these cases, the formation of the tube takes place in one and the same working step as the manufacture of the sausages.

Figure 4:
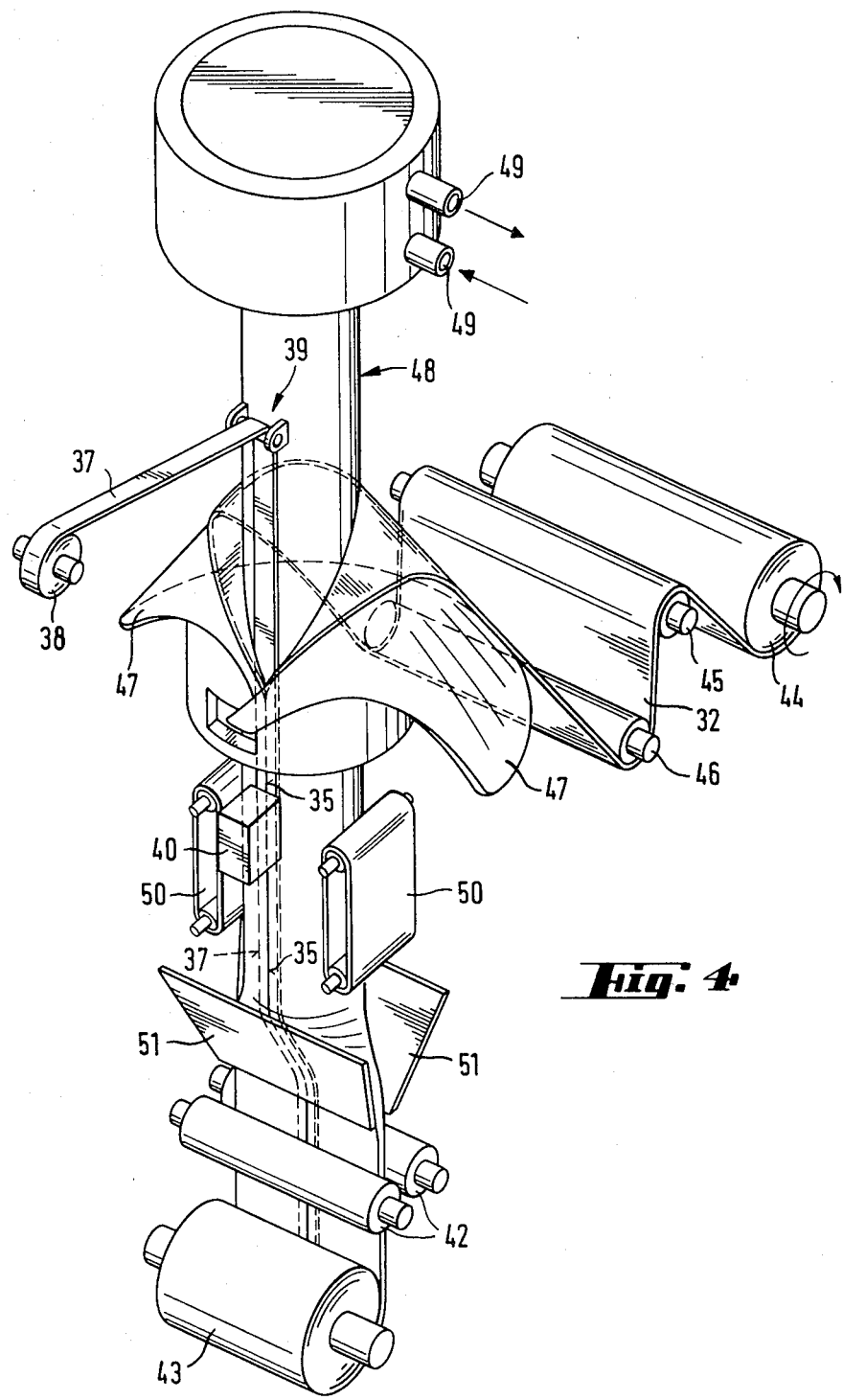

In an alternative shown in FIG. 4, the fiber-reinforced web 32 of regenerated cellulose is drawn off the roll 44 and passed over guide rollers 45 and 46 to a forming shoulder 47, where the tube is formed. The two edges of the web 32 approach one another with the formation of a butt seam 35. The cylindrical support element 48 is located in the interior of the tube, and it can be supplied with a coolant through the openings 49. Its external diameter corresponds to the internal diameter of the tube formed.

A film strip 37, for example of heat-sealable material, is unwound from the roll 38 and passed over an eye-type guide element 39 to the interior of the tube, the butt seam 35 being in the center of the film strip 37.

The jaw 40 is pressed on cyclically, the film strip 37 being sealed against the edge zones of the web which has been shaped into a tube.

On the outer surface of the tube, transport belts 50 push the tube cyclically down in the vertical direction. The tube passes metal sheets 51 which lay the tube flat, and a pair 42 of transport rollers, and is then wound up on the roll 43. To make a gas-permeable sealing seam, the seam region is perforated by means of a needle roller which is not shown, so that the structure shown in FIG. 5d results (without the adhesive layer 54).

Figure 5A:
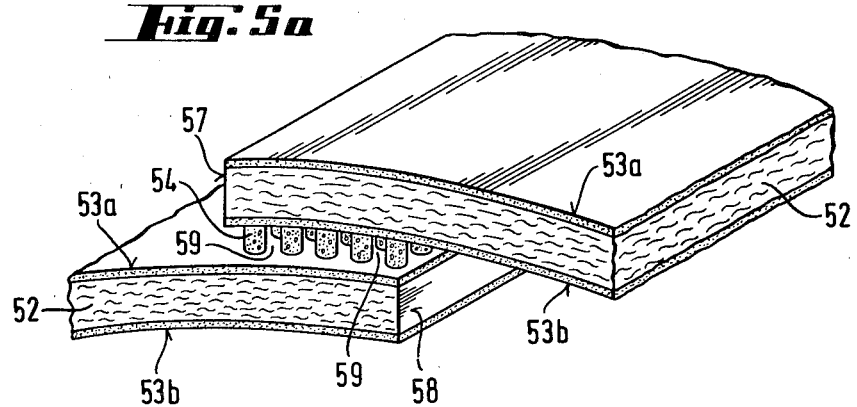

In FIG. 5a, those regions of the web 52 which are close to the edges 57 and 58 running parallel to the longitudinal axis are glued to one another with an overlap, the layer 54 which contains adhesive being located between the overlapping regions. The adhesion-promoting resin layers 53a and 53b are located on the surfaces of the web. The passages 59 in the adhesive layer pass through the adhesive applied with a punctiform structure.

Figure 5B:
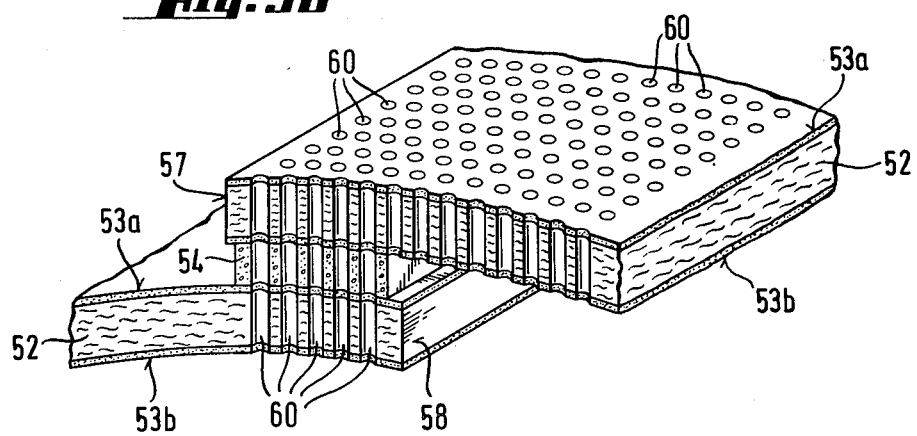

FIG. 5b shows a further embodiment of the gluing region shown in FIG. 5a. Perforations 60 in the region of edges 57 and 58, extend through the entire seam including the web 52 and the adhesive layer 54.

The seam region shown in FIG. 5c comprises two abutting edges 57 and 58 of the web 52. These edges are bonded by means of a film strip 37, which covers the two edges 57 and 58, via an adhesive-containing layer 54 and an adhesion-promoting resin layer 53. The adhesive layer passages 59 pass through the adhesive applied with a punctiform structure.

FIG. 5d shows a further embodiment of the gluing region shown in FIG. 5c. Perforations 60 in the region of the edges 57 and 58 and of the film strip 37, extend through the entire seam including the web 52, the adhesive-promoting resin layer 53, the adhesive layer 54 and the film strip 37.

The adhesive layer 54 shown in FIGS. 5c and 5d is not necessary if the film strip 37 is composed of a hot-sealable material and has a smoke-permeable structure produced, for example, by needle-punching.

In general, the material, composed of fiber-reinforced regenerated cellulose, of the web and, if appropriate, of the film strip is sufficiently smoke-permeable so that usually the perforation of the web or of the film strip, as shown in FIGS. 5b and 5d, is not required.

For the sake of clarity, the dimensions of the layers shown in FIGS. 5a to 5d are not true to scale.

Figure 6A:
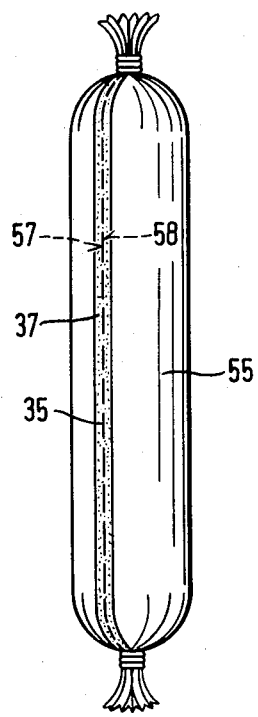
FIGS. 6a and 6b are plan views illustrating the filled tubular casing with film strips located on the outside or inside.
Figure 6B:
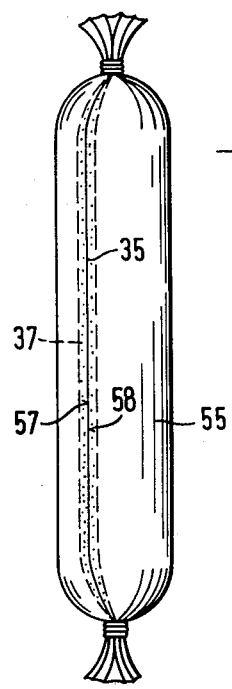

FIG. 6a shows the filled tubular casing 55 with a glued-in film strip 37 which covers the butt seam 35 substantially symmetrically and is located on the outside, and FIG. 6b shows the tubular casing 55 with the tube abutting edges 57 and 58 and the film strip 37 located on the inside.

In FIG. 7, the tube is produced analogously to the manner shown in FIG. 4. The reference numerals have the same meaning. In this example, however, the film strip is applied to the outside of the tube, a roller 56 being used for this purpose. To improve the contact of the roller 56 with the surfaces which are to be bonded, the tubular support element 48 used as a backing is provided in the gluing region with a bevelling 72. The support element 48 can also be designed as a filling pipe through which the filling is pressed into the tube which has been formed.

FIG. 8 shows a further development of the process, direct application of adhesive to the flat web being shown.

A web 62 of regenerated cellulose is passed from the stock roll 61 into a gravure-printing applicator unit which comprises a screened applicator roller 65, a doctor blade 64 and a counter-roller 63. The adhesive solution or dispersion is delivered from the stock vessel 66 into the trough 67. The adhesive applied in the form of stripes is dried in the drying tunnel 68. By means of the forming board 69, the support pipe 36 and the guide sleeve 34, the web 62 is shaped into a tube with an overlapped longitudinal seam, is laid flat by means of the pair 42 of draw-off rollers and is transported to the winding-up device 43.

FIG. 9 shows an alternative for the process sequence of forming the tube and gluing the edge regions with a pressure-sensitive adhesive. The web 32 drawn off a winding roll 44 and the adhesive tape 37 drawn off a winding roll 38 and stuck to the web 32 in the edge region of the web 32 pass through a forming board 69, shown in section in FIG. 9a, and an overlapping aid 70. Subsequently, the paper carrier 71 is peeled off the adhesive tape 37 and the inner edge region of the now tubular web 32 is glued to the now free surface of the layer 54 of pressure-sensitive adhesive, the web 32 passing through the support pipe 36, shown diagrammatically, with the guide sleeve 34.

EXAMPLE

A web of long-fibered hemp paper with a laid-flat width of 235 mm and a weight per unit area of 21 g/m² is unwound from a roll and coated on both sides with viscose by means of a flat-web coater. For example, the gap width is 0.8 mm and the web speed is 5 m/minute.

Subsequently, for precipitation and regeneration, the web is passed along spray nozzles, from which regeneration fluid is applied to the web provided with viscose. The regeneration fluid issuing from the first pair of nozzles is composed of 30 g/l of sulfuric acid, 260 g/l of ammonium sulfate and 100 g/l of sodium sulfate and is at a slightly elevated temperature of about 35° to 50° C. The proportion of sulfuric acid is increased in the subsequent nozzles. The web width is kept constant by means of a needle chain engaging on the two edges of the web, so that the shrinkage in the transverse direction, which usually occurs on regeneration, is prevented. The fiber-reinforced web of cellulose hydrate gel is then passed through washing, desulfurization and plasticizing baths. The web of cellulose hydrate gel having a width of 210 mm. The web is then predried in a drying section. On leaving this drying stage, the water content of the web is 80 to 150% by weight. The edges of the web are then gripped by needle clip chains, the web is led through a tenter frame and subsequently through several decks of a drying field. In the tenter frame 13, the web is stretched in the transverse direction to a width of 252 to 262 mm and is then dried, preferably at about 80° C., while it is still held at this width. The residual moisture content of the web is about 14% by weight, and the web has a breaking strength of 52 N/mm² in the longitudinal direction, a breaking strength of 58 N/mm² in the transverse direction and an elongation at break of about 17.5% in both directions.

In applying the anchoring layer to the web, the two-ply web is passed through a trough containing a coating fluid. The fluid is composed, for example, of a 1% aqueous solution of a modified melamine/formaldehyde resin ($^R$Accobond from Messrs ACC).

The two-ply web having the fluid coating on the outside is then passed through a gap formed by a blade or by so-called doctor rollers and which sets a defined thickness of the coating on the surfaces of the web. The web is dried wherein the liquid fractions of the coating are evaporated by the action of heat, hot air at about 115° C., and an unbroken film coating having a weight per unit area of 10 g/m² is formed. The web is then reconditioned by remoistening the web up to a water content of 8 to 10% by weight. Air saturated with water vapor at 80° to 98° C. is used for this purpose.

The fiber-reinforced web of regenerated cellulose is shaped into a tube, the two edges approaching one another to give a butt seam. A film strip composed of the same fiber-reinforced material as the web is unwound from a roll and passed via an eye-type holder into the interior of the tube, the butt seam being in the center of the film strip. There is a smoke-permeable adhesive layer on the surface of the film strip, for bonding of the two edges of the web. For this purpose, the adhesive layer is provided continuously, by means of a needle roller, with fine through-holes (diameter about 0.2 mm, 15 holes/cm). The adhesive is also applied in the form of a dispersion or solution to the film strip by means of screen printing with the use of a 40 mesh-perforated stencil and a spreading blade, the adhesive layer being present, after stripping off the solvent or dispersing agent, in the form of areas having a circular cross-section, a diameter of about 0.45 mm and a height of 20 to 30 μm. A jaw then presses the film strip against the edge zones of the web which has been shaped into a tube. A section of the tube is filled with sausage meat for cooked sausages by means of a conventional sausage-filling device under a filling pressure of 0.3 bar, and is closed. The sausage is then smoked in the customary manner, for example, 10–60 minutes in moist smoke at 70° to 80° C., is cooked in water at 80° to 82° C. for a further 10 minutes, is then cooled and is stored in a refrigerating chamber.

The change in the dimensions of the sausage is not observable, either before or after the cooking process. It always showed a full rounded appearance and retains its uniform diameter. The weight loss after storage in a refrigerated chamber for one week is less than 1%. After a first cut has been made in the sausage casing, it can be opened, and peeled off without effort by pulling the sealed-in film strip in the direction of the longitudinal axis, the film strip being used as a tear-open tab. Moreover, the sausage shows a uniform smoked coloring even in the seam region.

What is claimed is:

1. A casing for foodstuffs, comprising:
   a web material formed into a tubular casing by curving the longitudinally running edges of said web material around the longitudinal axis of said web material, meeting or overlapping said edges, and bonding said edges by a glued seam, wherein said web material comprises a fiber-reinforced regenerated cellulose comprising in the wet remoistened state, in the longitudinal direction of said web material, a breaking strength of about 15 to 30 N/mm² and an elongation at break of about 30 to 50% and, in the transverse direction of said web material, a breaking strength of about 15 to 35 N/mm² and an elongation at break of about 30 to 50%, said breaking strength in said transverse direction of said web material being equal to or greater than said breaking strength in said longitudinal direction of said web material;
   a layer comprising an essentially water-insoluble adhesion promoting resin, located at least in the region of said glued seam; and
   an adhesive layer for bonding said edges, wherein said adhesive layer comprises passages and/or interruptions, and/or a sheet-like textile, a sponge material, a foam, a microporous sheet or a membrane for providing permeability to smoke, whereby said casing is smoke-permeable over its entire circumference.

2. A casing as defined in claim 1, wherein said adhesion-promoting layer comprises a continuous layer on said web material.

3. A casing as defined in claim 1, wherein said longitudinally-running edges are overlapped and glued, wherein said adhesive layer is located between said overlapped edges.

4. A casing as defined in claim 3, further comprising at least one film strip which runs parallel to said longitudinal axis and is located between said overlapping edges or covers one or both overlapping edges, wherein said film strip is permeable to smoke.

5. A casing as defined in claim 1, wherein said longitudinally-running edges meet and are bonded by at least one film strip running parallel to said longitudinal axis and covering the two regions close to said edges, wherein said adhesive layer is located between said film strip and said regions close to said edges and wherein said adhesive-promoting layer is located between said adhesive and said web material, wherein the material of said film strip is permeable to smoke and/or comprises a structure which is permeable to smoke.

6. A casing as defined in claim 5, wherein said film strips are applied to the interior and exterior of said tubular casing.

7. A casing as defined in claim 5, further comprising a second adhesion-promoting layer located between said film strip and said adhesive.

8. A casing as defined in claim 5, wherein said smoke-permeable structure comprises orifices, interruptions, passages, gaps, pores or perforations.

9. A casing as defined in claim 5 or 4, wherein said film strip comprises a fiber-reinforced regenerated cellulose, wherein said breaking strength and said elongation at break are within said ranges indicated for said web material.

10. A casing as defined in claim 1, wherein said web material comprises a breaking strength of about 20 to 30 N/mm$^2$ in said longitudinal direction and a breaking strength of about 25 to 35 N/mm$^2$ in said transverse direction, said breaking strength being greater in said transverse direction than in said longitudinal direction.

11. A casing as defined in claim 1, wherein said web material comprises an elongation at break of about 30 to 40% in said longitudinal and said transverse directions.

12. A casing for foodstuffs, comprising:
a web material formed into a tubular casing by curving the longitudinally running edges of said web material around the longitudinal axis of said web material, meeting or overlapping said edges, and bonding said edges by a glued seam, wherein said web material comprises a fiber-reinforced regenerated cellulose comprising in the dry state a residual moisture content of about 8 to 10% by weight and a glycerol content of about 20 to 24% by weight, in the longitudinal direction of said web material, a breaking strength of about 50 to 70 N/mm$^2$ and, in the transverse direction of said web material, a breaking strength of about 50 to 75 N/mm$^2$, said breaking strength in said transverse direction of said web material being equal to or greater than said breaking strength in said longitudinal direction of said web material;
a layer comprising an essentially water-insoluble adhesion-promoting resin located at least in the region of said glued seam; and
an adhesive layer for bonding said edges wherein said adhesive layer comprises passages and/or interruptions, and/or a sheet-like textile, a sponge material, a foam, a microporous sheet or a membrane for providing permeability to smoke, whereby said casing is smoke-permeable over its entire circumference.

13. A casing as defined in claim 12, wherein said web material comprises an elongation at break of about 8 to 19%.

14. A casing as defined in claim 13, wherein said web material comprises an elongation at break of about 8 to 12%.

15. A casing as defined in claim 1, 6 or 12, wherein said adhesion-promoting layer comprises a cured cationic thermosetting resin.

16. A casing as defined in claim 15, wherein said cured cationic thermosetting resin comprises a urea-/aldehyde, melamine/aldehyde or phenol/aldehyde resin or a condensation product of a polyamidepolyamine, aliphatic polyamine or polyamide and bifunctional halohydrin or derivatives thereof.

17. A casing as defined in claim 16, wherein said bifunctional halohydrin derivative comprises epichlorohydrin.

18. A casing as defined in claim 1 or 12, wherein said adhesive layer comprises a material which sets without a chemical reaction.

19. A casing as defined in claim 18, wherein said adhesive layer comprises a hot-melt adhesive.

20. A casing as defined in claim 19, wherein said hot-melt adhesive comprises a polyester.

21. A casing as defined in claim 18, wherein said adhesive layer comprises a sealing layer of a thermoplastic resin.

22. A casing as defined in claim 21, wherein said thermoplastic resin comprises a polymer comprising vinylidene groups, wherein said sealing layer is anchored with said adhesion-promoting resin.

23. A casing as defined in claim 18, wherein said adhesive layer comprises a pressure-sensitive adhesive comprising a polyacrylate, polymethacrylate, or a resin based on a copolymer including acrylate and acrylonitrile co-monomers, wherein said pressure-sensitive adhesive is anchored with said adhesion-promoting resin.

24. A casing as defined in claim 23, wherein said copolymer comprises a homopolymer or copolymer comprising butyl acrylate and/or 2-ethyl-hexyl acrylate.

25. A casing as defined in claim 18, wherein said adhesive layer comprises thermally and/or chemically crosslinkable resins.

26. A casing as defined in claim 25, wherein said adhesive layer comprises a copolymer comprising reactive co-monomers.

27. A casing as defined in claim 26, wherein said acrylate resin comprises a carboxyl group.

28. A casing as defined in claim 1 or 12, wherein said tubular casing is shirred, wherein the gluing region is arranged around said longitudinal axis.

29. A casing as defined in claim 28, wherein said gluing region is helically arranged around said longitudinal axis.

30. A casing as defined in claim 1 or 12, wherein said adhesive layer comprises a microporous structure.

* * * * *